US012774067B2

(12) United States Patent
Zhang et al.

(10) Patent No.: US 12,774,067 B2
(45) Date of Patent: Oct. 27, 2026

(54) CRAWLING AND ADHESION DEVICE FOR UNDERWATER INSPECTION ROBOTS USED ON DAMS

(71) Applicants: Hohai University, Nanjing (CN); China Yangtze Power Co., Ltd., Beijing (CN)

(72) Inventors: Lei Zhang, Nanjing (CN); Yuhang Zhu, Nanjing (CN); Tao Zeng, Nanjing (CN); Junjie Li, Nanjing (CN); Yanjie Wang, Nanjing (CN)

(73) Assignees: HOHAI UNIVERSITY (CN); CHINA YANGTZE POWER CO., LTD. (CN)

( * ) Notice: Subject to any disclaimer, the term of this patent is extended or adjusted under 35 U.S.C. 154(b) by 169 days.

(21) Appl. No.: 18/946,112

(22) Filed: Nov. 13, 2024

(65) Prior Publication Data

US 2025/0162698 A1 May 22, 2025

(30) Foreign Application Priority Data

Nov. 17, 2023 (CN) ......................... 202311537769.2
Nov. 17, 2023 (CN) ......................... 202311537790.2

(51) Int. Cl.
*B63C 11/52* (2006.01)
*B62D 57/024* (2006.01)

(52) U.S. Cl.
CPC ............ *B63C 11/52* (2013.01); *B62D 57/024* (2013.01)

(58) Field of Classification Search
CPC .............................. B63C 11/52; B62D 57/024
See application file for complete search history.

(56) References Cited

U.S. PATENT DOCUMENTS 5,947,051 A * 9/1999 Geiger .................... E21B 41/04 114/313
6,276,478 B1 * 8/2001 Hopkins ................. B63B 71/00 180/164
6,317,387 B1 * 11/2001 D'Amaddio ........... G01N 29/11 367/129
2015/0148949 A1 * 5/2015 Chin ........................ B25J 5/007 700/245

FOREIGN PATENT DOCUMENTS

CN 114459349 A * 5/2022 ............. G01B 17/00
GB 2632780 A * 2/2025 ............. G01N 29/28
KR 20130098062 A * 9/2013 ........... B64C 39/024

* cited by examiner

*Primary Examiner* — Richard G Davis

(57) ABSTRACT

Disclosed is crawling device for underwater inspection robots used on dams. The crawling device includes at least one set of wheeled leg mechanisms, an angle adjusting mechanism and a length adjusting mechanism, wherein an upper end of the length adjusting mechanism is connected with a robot; the wheeled leg mechanism includes a shell, adhesion units and a crawling wheel arranged under the shell; the adhesion unit includes a suction cup, which is arranged under the shell and adheres to a dam surface through negative pressure suction; the length adjusting mechanism is used for adjusting a distance between the wheeled leg mechanism and a robot body; and the angle adjusting mechanism is used for adjusting an angle of the wheeled leg mechanism with respect to a horizontal dam surface.

18 Claims, 11 Drawing Sheets

CRAWLING AND ADHESION DEVICE FOR UNDERWATER INSPECTION ROBOTS USED ON DAMS

CROSS-REFERENCE TO RELATED APPLICATIONS

This application claims priority to Chinese Application No. CN202311537790.2, having a filing date of Nov. 17, 2023 and CN202311537769.2, having a filing date of Nov. 17, 2023, the entire contents of which are hereby incorporated by reference.

TECHNICAL FIELD

The invention relates to the technical field of underwater operations, in particular to a crawling and adhesion device for underwater inspection robots used on dams.

BACKGROUND OF THE INVENTION

As the demand for underwater operations increases, particularly in fields such as underwater resource development and engineering construction that require underwater inspections, inclined dam surfaces are common in underwater construction. Compared to traditional vertical structures, inclined dam surfaces can reduce flow velocity, decrease the erosion of riverbanks by water flow, promote sediment deposition, and enhance the stability of river channels. The ability of underwater robots to crawl on inclined dam surfaces is crucial, as the motion interference from deep and strong currents, as well as mixed flows, poses a great challenge to crawling on inclined dam surfaces.

Robotics technology has always been one of the research focuses of researchers. Underwater robots play a crucial role in marine equipment cleaning, underwater structure exploration, and hydraulic device maintenances. The ability to crawl and adhere to dam surfaces is necessary for structures such as ports and dams. However, how to on inclined dam surfaces has been one of the challenges in the research of underwater robots.

SUMMARY OF THE INVENTION

To address the issues in the prior art, the invention provides a crawling and adhesion device for underwater inspection robots used on dams. After adjusting the posture of an underwater robot, the crawling and adhesion device can adapt to inclined dam surfaces ranging from 0° to 90°, allowing the underwater robot to stably adhere to the underwater inclined dam surfaces. Additionally, the crawling and adhesion device compensates for height and angle errors caused by the operation of two sets of wheeled leg mechanisms, preventing the underwater robot from detaching from the inclined dam surfaces due to strong currents, thus enhancing the stability of adhesion during underwater operations.

In order to achieve the above purpose, the invention provides the following technical scheme.

A crawling and adhesion device for underwater inspection robots used on dams comprises at least one set of wheeled leg mechanisms, an angle adjusting mechanism and a length adjusting mechanism, wherein an upper end of the length adjusting mechanism is connected with a robot; the wheeled leg mechanism comprises a shell, adhesion units and a crawling wheel arranged under the shell; the adhesion unit comprises a suction cup arranged under the shell and a negative pressure pump arranged in a robot body, and the suction cup is connected to the negative pressure pump via a telescopic hose, so as to adhere to a dam surface through negative pressure generated by the negative pressure pump; and the crawling wheel is a universal wheel which automatically adjusts the direction of travel under the power of the robot body, facilitating the precise attachment of the adhesion unit to the inclined dam surface. During operation of the crawling and adhesion device, the adhesion units are locked into position; when floating, the suction cups detach from the dam surface, and the crawling wheels serve as a load-bearing mechanism for the entire crawling and adhesion device and the robot to overcome obstacles. The length adjusting mechanism is used for adjusting a distance between the wheeled leg mechanism and the robot body, and the angle adjusting mechanism is used for adjusting an angle of the wheeled leg mechanism with respect to a horizontal dam surface.

Further, the length adjusting mechanism is a spiral length adjusting mechanism, and comprises a telescopic outer tube arranged outside, a telescopic inner tube arranged inside the telescopic outer tube and a bolt, and the telescopic outer tube and the telescopic inner tube are connected threadedly; and a groove is formed in the telescopic outer tube, a tube wall of the telescopic outer tube is provided with a threaded hole corresponding to the groove, and the bolt is embedded in the telescopic outer tube through the threaded hole in the tube wall to restrict the rotation of threads, secure the axial position of both the telescopic outer tube and the telescopic inner tube, and prevent axial sliding due to applied force.

Preferably, a boss is provided on an outer surface of the telescopic outer tube corresponding to the groove, and the threaded hole is located on both the boss and the tube wall.

After the underwater robot body adjusts its posture, two sets of crawling and adhesion devices exhibit a significant difference in axial distance due to the inclined dam surface. The length of threaded fit between the telescopic outer tube and the telescopic inner tube is adjusted to compensate for a height difference produced by the two sets of crawling and adhesion devices, ensuring that the adhesion unit can accurately adhere to the correct position.

Further, the angle adjusting mechanism is a swinging type angle adjusting mechanism, and comprises a telescopic inner tube arranged in the telescopic outer tube, an upper part of the telescopic inner tube is positioned in the telescopic outer tube, a lower part is arranged in the shell and connected with the shell through a first pivot pin, and the telescopic inner tube is able to swing around the first pivot pin; and a plurality of inclined positioning plates are arranged in the shell, and the inclined positioning plates are matched with a lower end of the telescopic inner tube and used for limiting a position of the telescopic inner tube.

Further, the shell further comprises a bearing wall, the plurality of inclined positioning plates are arranged on the bearing wall, and the first pivot pin is also arranged on the bearing wall.

Further, the number of the inclined positioning plates is three, one is arranged in a vertical direction, and the other two are positioned in bilateral symmetry with respect to the vertical direction. Preferably, the three inclined positioning plates are a +20° inclined positioning plate, a 0° inclined positioning plate, and a −20° inclined positioning plate from left to right.

Further, a lower end of the telescopic inner tube is provided with an external thread, a bottom of the inclined positioning plate is provided with an internal thread matching the external thread at the lower end of the telescopic inner tube, and the telescopic inner tube is fixed to the inclined positioning plate via threaded connection, allowing for the adjustment and fixation of the crawling and adhesion device to operate at a certain incline angle, enabling the crawling and adhesion device to adapt to various degrees of inclined dam surfaces; and the crawling and adhesion devices may be mounted horizontally, at a 45° angle, or vertically on the robot body.

Further, the crawling and adhesion device further comprises a connector connected with the robot, and the connector comprises a male connector arranged on an upper part of the length adjusting mechanism and a female connector arranged on the robot body. Preferably, the connector is a quick-change connector, and the female connector is embedded in the robot body, such that the streamlined shape of the robot will not be affected.

Further, one end of the male connector comprises a centrally positioned prism and an external connecting column arranged outside the prism, and the other end of the male connector is connected with the length adjusting mechanism; the female connector comprises a centrally positioned prismatic hole and an inner connecting column arranged outside the prismatic hole; and the prism matches the prismatic hole, the outer connecting column matches the inner connecting column, and threaded connection is achieved through inner threads on an inner wall of the outer connecting column and outer threads on an outer wall of the inner connecting column.

Further, the wheeled leg mechanism further comprises a buoyancy block arranged in the shell and fixedly installed on a supporting frame. The density of the buoyancy block is less than that of water, which increases the overall buoyancy of the wheeled leg mechanism, allowing the entire crawling and adhesion device to achieve neutral buoyancy in water. This configuration does not affect the center of gravity of the underwater robot body, thus enhancing the stability of the device and ensuring stable operation of the underwater robot.

Further, the crawling and adhesion device further comprises connecting tubes, the wheeled leg mechanism, the length adjusting mechanism, the angle adjusting mechanism and the connectors connected with the robot all feature at least two sets, adjacent sets are connected via the connecting tubes, and two ends of the connecting tube are respectively connected with the length adjusting mechanisms in the two sets.

Further, two ends of the connecting tube are provided with bosses which have internal threads, and a connecting column which has external threads is welded onto the length adjusting mechanism, thus realizing threaded connection. The counter-rotating threaded connection provides excellent fastening to prevent loosening and detachment at the connection points, thereby constraining the distance between different sets of wheeled leg mechanisms and improving the overall rigidity of the crawling and adhesion device, as well as its stability when the crawling and adhesion device operates in strong or turbulent flows.

Additionally, by changing the length of the connecting tube or replacing it with tubes of different lengths, the distance between the wheeled leg mechanisms can be adjusted, broadening the application range of the crawling and adhesion device.

Further, the wheeled leg mechanism, the length adjusting mechanism, the angle adjusting mechanism and the connectors connected with the robot all feature four sets, arranged as one set at the front, one at the back, and one on each side, with the front two sets forming a pair and the rear two sets forming another pair.

In use, based on design drawings of the underwater dam surface and the underwater detection posture of the robot body, the crawling and adhesion device may be mounted horizontally, at a 45° angle, or vertically on the robot body. When the operational surface of the crawling and adhesion device is an inclined dam surface, there is a significant difference in the axial distance between the front pair and rear pair of wheeled leg mechanisms. The lengths of the length adjusting mechanisms for both pairs are adjusted to compensate for the height difference produced by the two sets of wheeled leg mechanisms.

Further, the connecting tube is a hollow cylindrical tube, which not only reduces weight but also offsets part of the gravitational force acting on the crawling and adhesion device in water.

Additionally, the shell of the wheeled leg mechanism is designed with lightweight skin to ensure an overall streamlined shape, thereby reducing water resistance and weight while also alleviating part of the gravitational force acting on the crawling and adhesion device in water.

Further, the supporting framework is arranged on a bottom of the shell, serving as a base to enclose the shell, and the bearing wall is mounted on the supporting framework. The supporting framework provides rigid support for the adhesion units, the crawling wheels, and the bearing wall. Additionally, the supporting framework and the bearing wall are integrated into a single structure.

Further, the adhesion unit is designed for modular installation, allowing for the selection of an appropriate number of units to be installed on the wheeled leg mechanism as needed. Moreover, the adhesion unit is fixed to the supporting framework with a flange.

Further, by employing a mixed-flow pump to create negative pressure suction, the adhesion unit can automatically compensate for variations in height and angle on a suction surface, accommodating irregular and uneven dam surfaces.

Further, the adhesion unit further comprises an underwater negative pressure pump, a displacement compensation component and a waterproof electromagnetic directional valve; an end of the underwater negative pressure pump is provided with an inlet check valve and an outlet check valve; a bottom of the suction cup is provided with a permeable flexible cushion layer, a suction cup support is fixedly connected to a top of the suction cup, and a spherical hinge cover plate is fixedly connected to the suction cup support; the displacement compensation component comprises a hydraulic cylinder, a hydraulic cylinder piston is arranged in the hydraulic cylinder, a piston rod of the hydraulic cylinder piston is connected with a spherical hinge joint, the piston rod fits into a shank of the spherical hinge joint, and the shank of the spherical hinge joint is located in the hydraulic cylinder; a return spring is arranged between the shank of the spherical hinge joint and an inner wall of the hydraulic cylinder, a spherical head of the spherical hinge joint is hinged to the spherical hinge cover plate, and a preload spring abutting against the spherical head of the spherical hinge joint is arranged in the suction cup support; and the waterproof electromagnetic directional valve is provided with four valve ports, and the four valve ports are respectively connected with the inlet check valve, the outlet check valve, the suction cup and the hydraulic cylinder.

Further, the underwater negative pressure pump comprises a watertight compartment, a gear box fixedly connected with the watertight compartment, and a negative pressure pump cylinder fixedly connected with the gear box; a gear motor is arranged in the watertight compartment, a small bevel gear and a large bevel gear engaging with the small bevel gear are arranged in the gear box, and a negative pressure pump piston and a connecting rod connected with the negative pressure pump piston are arranged in the negative pressure pump cylinder; a motor shaft of the gear motor is connected with the small bevel gear, a rotating dynamic seal is employed between the small bevel gear and the watertight compartment, the large bevel gear is connected with the connecting rod, and the gear motor drives the negative pressure pump piston to reciprocate through bevel gear transmission; and the inlet check valve and the outlet check valve are arranged at an end of the negative pressure pump cylinder, and a first filter device is arranged at a top of the gear box.

Further, a filter membrane is arranged in a suction cup chamber of the suction cup, a suction cup water outlet connected with a suction cup water inlet is formed in a side face of the suction cup, the suction cup water inlet is provided with a second filter device, and the suction cup water outlet is connected with one of the valve ports of the waterproof electromagnetic directional valve through a telescopic hose.

Further, an end, connected with the watertight compartment, of the gear box is provided with a plurality of cylindrical positioning bosses, and the plurality of cylindrical positioning bosses are connected with limiting holes in one end of the gear motor to radially fix the gear motor.

Further, a motor support plate is arranged in the watertight compartment in a direction perpendicular to an axial direction of the gear motor, the gear motor is fixedly installed on the motor support plate, and the motor support plate is used for axially fixing the gear motor.

Further, the displacement compensation component further comprises a guide limiting sleeve, which is arranged between the inner wall of the hydraulic cylinder and the shank of the spherical hinge joint and is tightly attached to a bottom of the hydraulic cylinder by means of an elastic force of the return spring.

Further, a plurality of suction cups are provided, and accordingly, a plurality of displacement compensation components are provided; and the plurality of suction cups are connected through telescopic hoses and then linked to one of the valve ports of the waterproof electromagnetic directional valve, and the plurality of hydraulic cylinders are also connected through telescopic hoses and then linked to one of the valve ports of the waterproof electromagnetic directional valve.

Further, a dynamic seal ring is arranged between the small bevel gear and the watertight compartment.

Further, a second Glyd ring and a second dustproof ring are arranged between the hydraulic cylinder piston and the inner wall of the hydraulic cylinder, and a third dustproof ring is arranged between a bottom end of the hydraulic cylinder and the shank of the spherical hinge joint.

The four valve ports of the waterproof electromagnetic directional valve are ports a, b, c, and d. Port a is connected to the inlet check valve, port b to the outlet check valve, port c to the suction cup, and port d to the hydraulic cylinder. A control method for the adhesion unit is as follows:

opening the inlet check valve, as well as ports a and c of the waterproof electromagnetic directional valve, closing the outlet check valve, as well as ports b and d of the waterproof electromagnetic directional valve, and starting the gear motor which drives the negative pressure pump piston to move left through bevel gear transmission to extract water from the suction cup chamber of the suction cup into the negative pressure pump cylinder;

closing the inlet check valve, as well as ports a and c of the waterproof electromagnetic directional valve, opening the outlet check valve, as well as ports b and d of the waterproof electromagnetic directional valve, reversing the rotation of the gear motor to drive the negative pressure pump piston to move right through bevel gear transmission, discharging water from the negative pressure pump cylinder into the hydraulic cylinder from the top, pushing the hydraulic cylinder piston to move axially downwards, and using the structure of the spherical hinge joint and the preload force of the preload spring to keep the suction cup support in a corrected rotational state relative to the spherical hinge joint, to compensate for the distance between the metal suction cup and the dam surface;

after the operation is complete, opening the inlet check valve, as well as the ports a and d of the waterproof electromagnetic directional valve, closing the outlet check valve, as well as the ports b and c of the waterproof electromagnetic directional valve, making the gear motor drive the negative pressure pump piston to move left through bevel gear transmission, extracting water from the hydraulic cylinder into the negative pressure pump cylinder, and allowing the metal suction cup to detach from the dam surface under the action of the return spring.

Preferably, the crawling wheel is a polyurethane universal wheel.

Compared with the prior art, the crawling and adhesion device for underwater inspection robots used on dams provided by the invention has the following beneficial effects.

(1) After adjusting the posture of the underwater robot, the crawling and adhesion device can adapt to inclined dam surfaces ranging from 0° to 90°, allowing the underwater robot to stably adhere to the underwater inclined dam surfaces. Additionally, the crawling and adhesion device compensates for height and angle errors caused by the operation of two sets of wheeled leg mechanisms, preventing the underwater robot from detaching from the inclined dam surfaces due to strong currents, thus enhancing the stability of adhesion during underwater operations.

(2) The crawling and adhesion device of the invention has a simple structure, is easy to manufacture and install, and may be mounted horizontally, at a 45° angle, or vertically on the robot. With the addition of the −20°, 0°, and 20° inclined positioning plates in the crawling and adhesion device, the crawling and adhesion device can adapt to dam surfaces with inclinations ranging from 0° to 90°. The length and angle compensation effects are excellent, and the adhesion strength is high.

(3) The adhesion unit of the invention allows the suction cup to firmly adhere to uneven dam surfaces. It can automatically compensate for the distance between the suction cup and the dam surface, enables the negative pressure pump to operate normally under varying water pressures at different depths, and achieves significant adhesion with minimal power consumption. Additionally, the suction force generated by the negative pressure pump piston can be transmitted to the hydraulic cylinder via the suction cup. The hydraulic cylinder is mounted on the supporting frame of the crawling and adhesion device, which transfers the suction force to the crawling and adhesion device. In this way, the suction force is prevented from being transmitted to the telescopic hose, allowing the telescopic hose to function solely for water intake and drainage. This effectively addresses the issue in the prior art where the water pump removes water from the suction cup chamber to create negative pressure suction, and the suction force is then transmitted to the telescopic hose, causing the device to be unable to perform stable construction due to the lack of sufficient stiffness in its structure to resist underwater strong current impacts.

BRIEF DESCRIPTION OF DRAWINGS

FIG. 7 is a schematic diagram of a crawling and adhesion device, after being equipped with a robot, adapting to dam surfaces with various slopes in Embodiment 1 of the invention; wherein FIG. 7*a* shows a crawling and adhesion device at 0° with a horizontal dam surface, FIG. 7*b* shows an angle ranging from 0° to 15° between a crawling and adhesion device and a horizontal dam surface, FIG. 7*c* shows an angle ranging from 15° to 35° between a crawling and adhesion device and a horizontal dam surface, FIG. 7*d* shows an angle ranging from 35° to 55° between a crawling and adhesion device and a horizontal dam surface, FIG. 7*e* shows an angle ranging from 55° to 75° between a crawling and adhesion device and a horizontal dam surface, FIG. 7*f* shows an angle ranging from 75° to 90° between a crawling and adhesion device and a horizontal dam surface, and FIG. 7*g* shows an angle of 90° between a crawling and adhesion device and a horizontal dam surface;

DESCRIPTION OF REFERENCE NUMERALS

1. wheeled leg mechanism; 2. connecting tube; 3. male connector; 4. telescopic outer tube; 5. telescopic inner tube; 6. first pivot pin; 7. buoyancy block; 8. bearing wall; 9. adhesion unit; 10. shell; 11. suction cup; 12. crawling wheel; 13. robot; 14. female connector; 15. bolt; 16. inclined positioning plate; 17. supporting frame; 31. prism; 32. external connecting column; 41. groove; 141. prismatic hole; 142. internal connecting column; 1-1. motor support plate; 1-2. watertight compartment; 1-3. gear motor; 1-4. small bevel gear; 1-5. big bevel gear; 1-6. ceramic thrust bearing; 1-7. connecting rod; 1-8. first dustproof ring; 1-9. inlet check valve; 1-10. outlet check valve; 1-11. negative pressure pump piston; 1-12. first Glyd ring; 1-13. second pivot pin; 1-14. negative pressure pump cylinder; 1-15. first filter device; 1-16. gear box; 1-17. dynamic seal ring; 1-18. pressure tube fixing sleeve; 1-19. pressure tube; 1-20. hydraulic cylinder tube connector; 1-21. hydraulic cylinder piston; 1-22. second Glyd ring; 1-23. second dustproof ring; 1-24. return spring; 1-25. hydraulic cylinder; 1-26. guide limiting sleeve; 1-27. piston rod; 1-28. third dustproof ring; 1-29. spherical hinge cover plate; 1-30. spherical hinge joint; 1-31. preload spring; 1-32. suction cup support; 1-33. suction cup water inlet tube connector; 1-35. second filter device; 1-36. permeable flexible cushion layer; 1-37. filter membrane; 1-38. telescopic hose; 1-39. waterproof electromagnetic directional valve; 1601. cylindrical positioning boss.

DETAILED DESCRIPTION OF THE INVENTION

The technical schemes in the embodiments of the present invention are clearly and completely described in the following with reference to the drawings in the embodiments of the present invention. It is obvious that the described embodiments are only some of the embodiments of the present invention and are not all the embodiments thereof. All other embodiments obtained by those of ordinary skill in the art based on the embodiments of the present invention without inventive effort are within the scope of the present invention.

Embodiment 1

Figure 1:
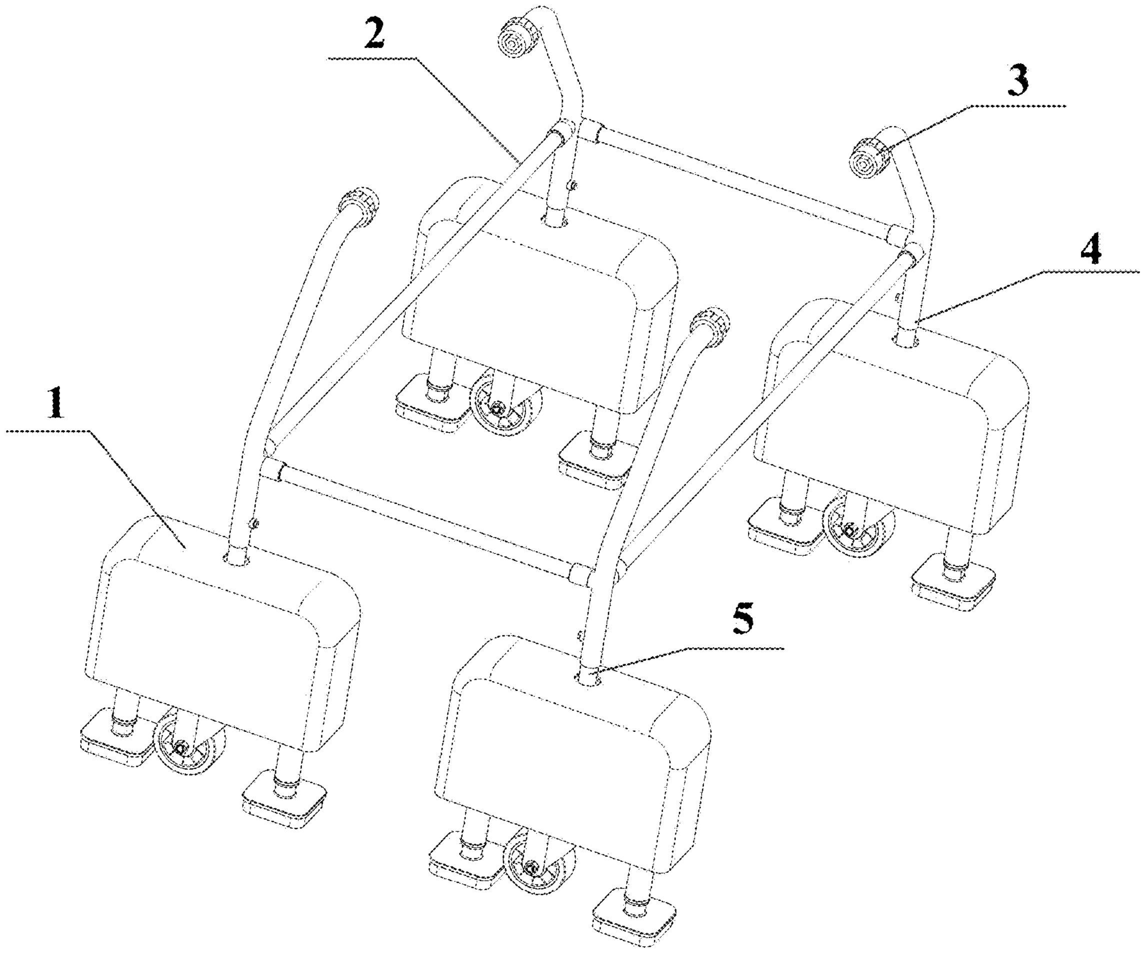
FIG. 1 is a structural diagram of a crawling and adhesion device adhering to a dam surface in Embodiment 1 of the invention.
Figure 2:
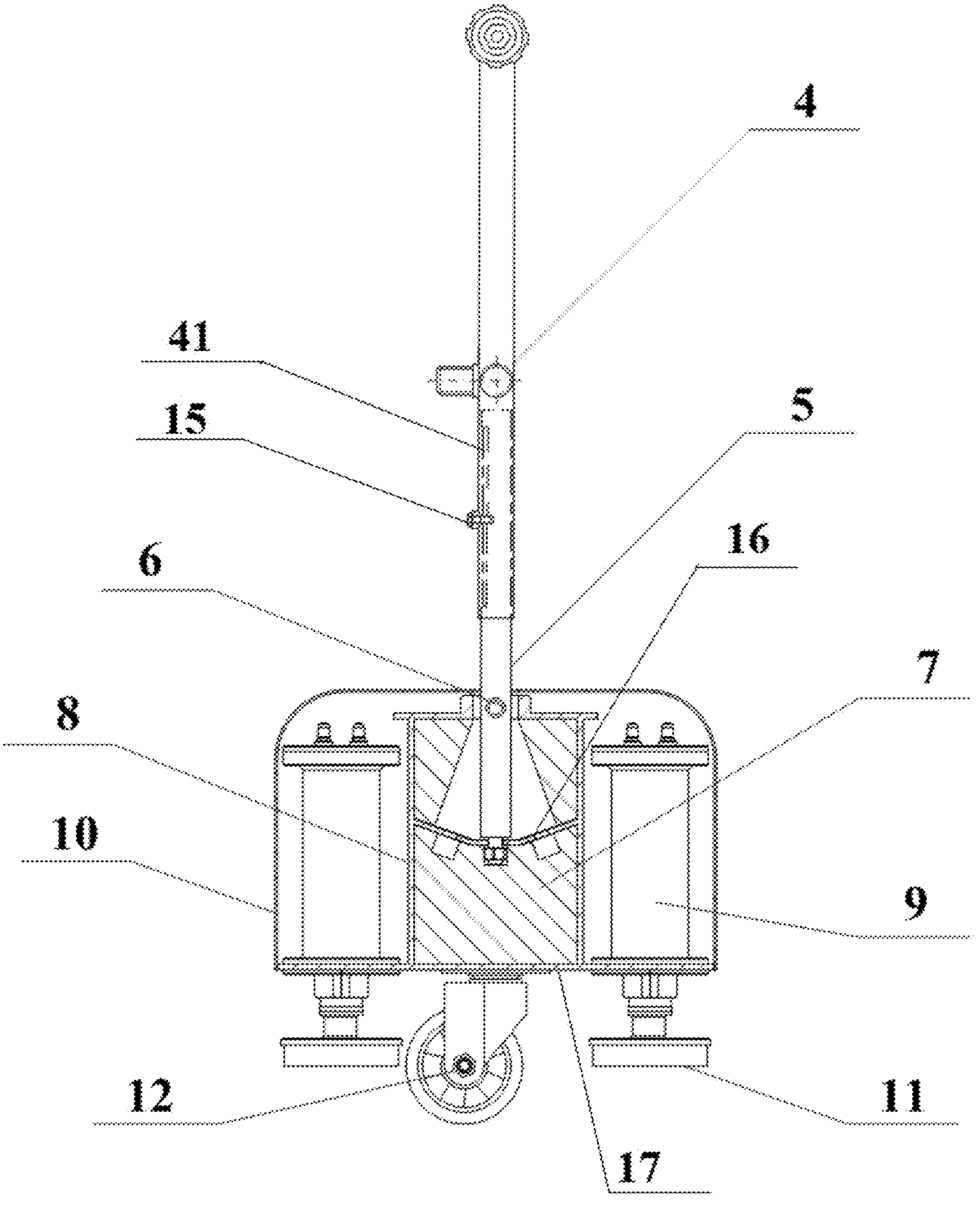
FIG. 2 is a front view of a single leg of a crawling and adhesion device in Embodiment 1 of the invention.
Figure 3:
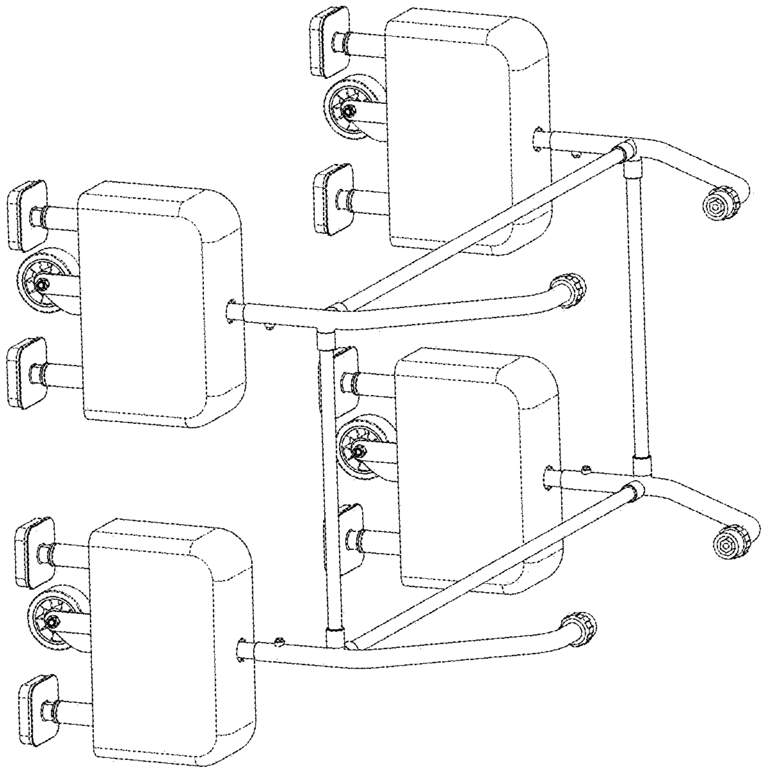
FIG. 3 is a schematic diagram of a crawling and adhesion device being vertically mounted and adhering to a dam surface in Embodiment 1 of the invention.
Figure 4:
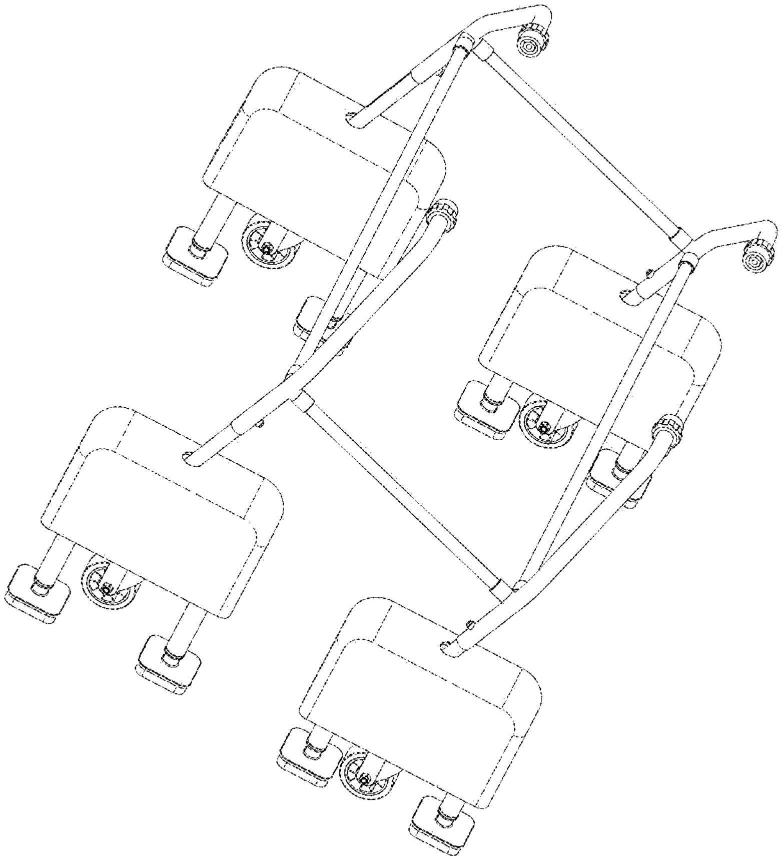
FIG. 4 a schematic diagram of a crawling and adhesion device being mounted at a 45° angle and adhering to a dam surface (15°-35°) in Embodiment 1 of the invention.
Figure 5:
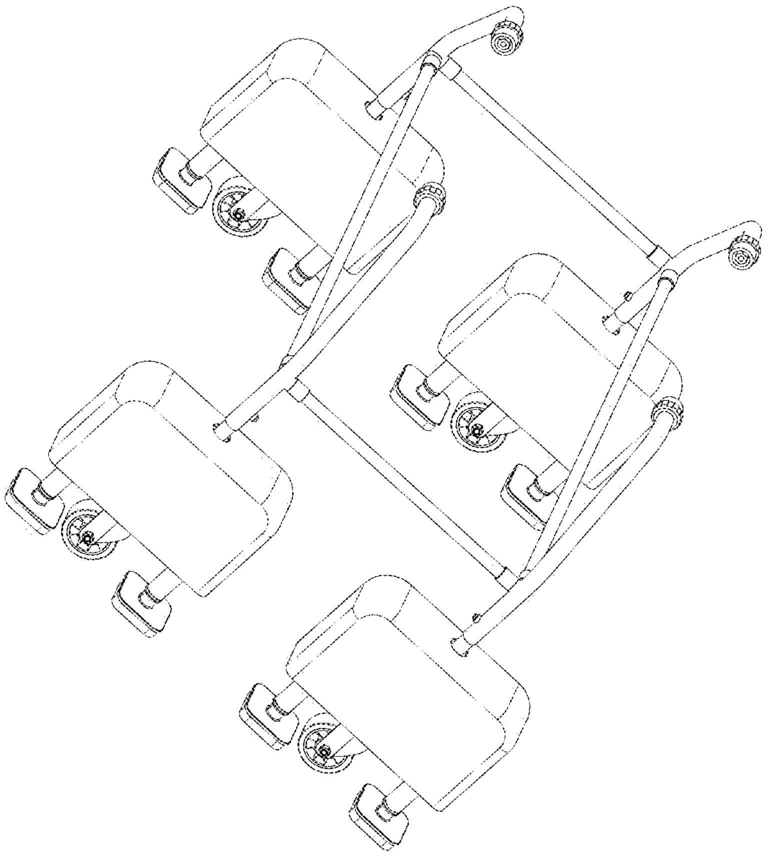
FIG. 5 a schematic diagram of a crawling and adhesion device being mounted at a 45° angle and adhering to a dam surface (35°-55°) in Embodiment 1 of the invention.
Figure 6:
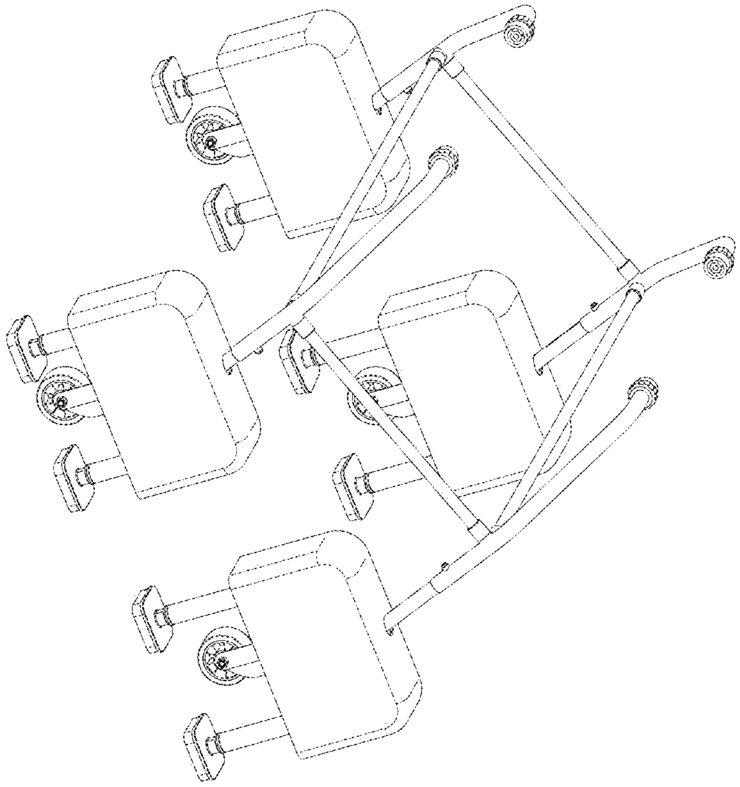
FIG. 6 a schematic diagram of a crawling and adhesion device being mounted at a 45° angle and adhering to a dam surface (55°-75°) in Embodiment 1 of the invention.

As shown in FIGS. 1 and 2, the invention provides a crawling and adhesion device for underwater inspection robots 13 used on dams, which comprises at least one set of wheeled leg mechanisms 1, an angle adjusting mechanism and a length adjusting mechanism, wherein an upper end of the length adjusting mechanism is connected with a robot 13; the wheeled leg mechanism 1 comprises a shell 10, adhesion units 9 and a crawling wheel 12 arranged under the shell 10; the adhesion unit 9 comprises a suction cup 11, which is arranged under the shell 10 and adheres to a dam surface through negative pressure generated by a negative pressure pump; and the crawling wheel 12 is a universal wheel which automatically adjusts the direction of travel under the power of a robot 13 body, facilitating the precise attachment of the adhesion unit 9 to the inclined dam surface. During operation of the crawling and adhesion device, the adhesion units 9 are locked into position; when floating, the suction cups detach from the dam surface, and the crawling wheels 12 serve as a load-bearing mechanism for the entire crawling and adhesion device and the mounted robot 13 to overcome obstacles. The length adjusting mechanism is used for adjusting a distance between the wheeled leg mechanism 1 and the robot 13 body, and the angle adjusting mechanism is used for adjusting an angle of the wheeled leg mechanism 1 with respect to a horizontal dam surface.

In a specific implementation of this embodiment, the length adjusting mechanism is a spiral length adjusting mechanism, and comprises a telescopic outer tube 4 arranged outside, a telescopic inner tube 5 arranged inside the telescopic outer tube 4 and a bolt 15, and the telescopic outer tube 4 and the telescopic inner tube 5 are connected threadedly; and a groove 41 is formed in the telescopic outer tube 4, a tube wall of the telescopic outer tube 4 is provided with a threaded hole corresponding to the groove 41, and the bolt 15 is embedded in the telescopic outer tube 4 through the threaded hole in the tube wall to restrict the rotation of threads, secure the axial position of both the telescopic outer tube 4 and the telescopic inner tube 5, and prevent axial sliding due to applied force.

Preferably, a boss is provided on an outer surface of the telescopic outer tube 4 corresponding to the groove 41, and the threaded hole is located on both the boss and the tube wall.

After the underwater robot 13 body adjusts its posture, two sets of crawling and adhesion devices exhibit a significant difference in axial distance due to the inclined dam surface. The length of threaded fit between the telescopic outer tube 4 and the telescopic inner tube 5 is adjusted to compensate for a height difference produced by the two sets of crawling and adhesion devices, ensuring that the adhesion unit 9 can accurately adhere to the correct position.

In a specific implementation of this embodiment, the angle adjusting mechanism is a swinging type angle adjusting mechanism, and comprises a telescopic inner tube 5 arranged in the telescopic outer tube 4, an upper part of the telescopic inner tube 5 is positioned in the telescopic outer tube 4, a lower part is arranged in the shell 10 and connected with the shell 10 through a first pivot pin 6, and the telescopic inner tube 5 is able to swing around the first pivot pin 6; and a plurality of interconnected inclined positioning plates 16 are arranged in the shell 10, and the inclined positioning plates 16 are matched with a lower end of the telescopic inner tube 5 and used for limiting a position of the telescopic inner tube 5.

The shell 10 further comprises a bearing wall 8, the plurality of inclined positioning plates 16 are arranged on the bearing wall 8, and the first pivot pin 6 is also arranged on the bearing wall 8.

Preferably, the number of the inclined positioning plates is three, one is arranged in a vertical direction, and the other two are positioned in bilateral symmetry with respect to the vertical direction. Preferably, the three inclined positioning plates are a +20° inclined positioning plate, a 0° inclined positioning plate, and a −20° inclined positioning plate from left to right.

Figure 7:
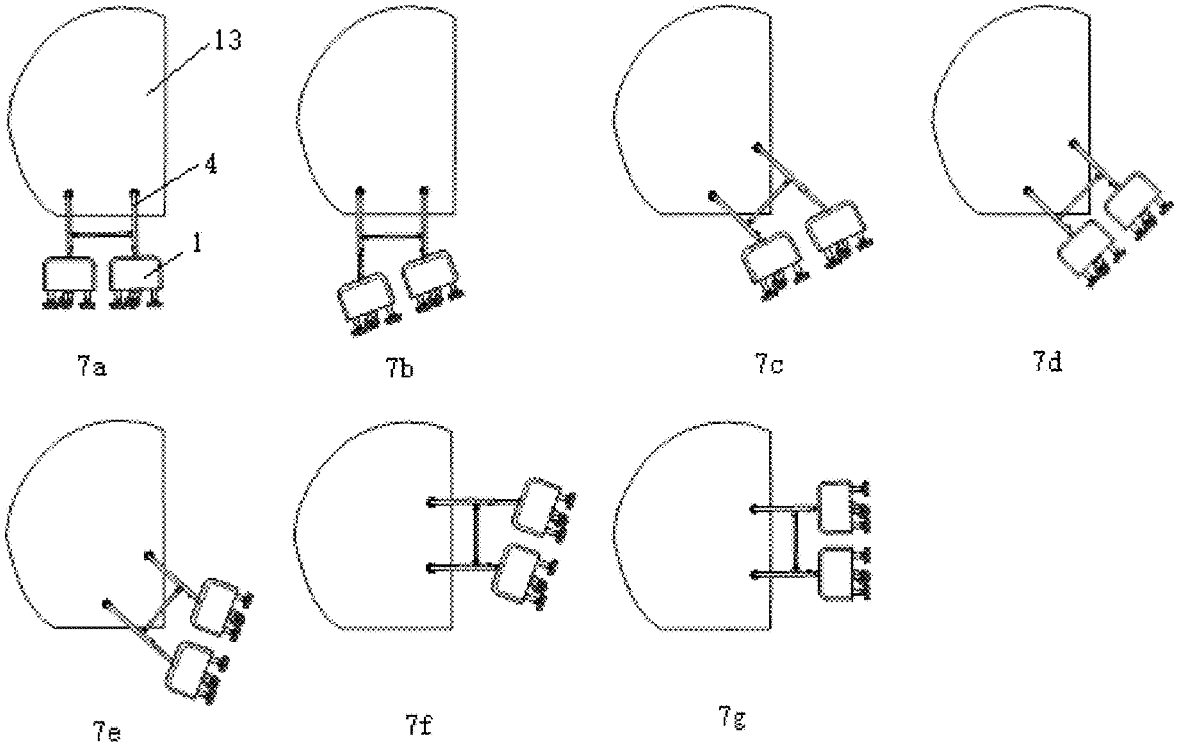

In a specific implementation of this embodiment, as shown in FIGS. 2 and 7, a lower end of the telescopic inner tube 5 is provided with an external thread, a bottom of the inclined positioning plate 16 is provided with an internal thread matching the external thread at the lower end of the telescopic inner tube 5, and the telescopic inner tube 5 is fixed to the inclined positioning plate 16 via threaded connection, allowing for the adjustment and fixation of the crawling and adhesion device to operate at a certain incline angle, enabling the crawling and adhesion device to adapt to various degrees of inclined dam surfaces; and the crawling and adhesion devices may be mounted horizontally, at a 45° angle, or vertically on the robot 13 body. When installed horizontally (referring to the installation angle of the crawling and adhesion device with respect to the robot 13, as shown in FIGS. 7*a* and 7*b*), the combined angular compensation provided by the permeable flexible cushion layer on the bottom of the suction cup 11 and the −20° angle adjusting mechanism (i.e., the telescopic inner tube 5 is fixed onto the −20° inclined positioning plate) enables adaptation to inclined dam surfaces between 0° and 15° (as shown in FIG. 7*b*). When installed at a 45° angle, in a case where the angle adjusting mechanism is mounted on the −20° inclined positioning plate, the combined compensation provided by the permeable flexible cushion layer on the bottom of the suction cup 11 and in the height direction enables adaptation to inclined dam surfaces between 15° and 35° (45°−20°±10°) (as shown in FIG. 7*c*); in a case where the angle adjusting mechanism is mounted on the 0° inclined positioning plate, the permeable flexible cushion layer on the bottom of the suction cup 11 enables adaptation to inclined dam surfaces between 35° and 55° (45°±10°) (as shown in FIG. 7*d*); in a case where the angle adjusting mechanism is mounted on the +20° inclined positioning plate, the combined compensation provided by the permeable flexible cushion layer on the bottom of the suction cup 11 and in the height direction enables adaptation to inclined dam surfaces between 55° and 75° (45°+20°±10°) (as shown in FIG. 7*e*). When installed vertically, in a case where the angle adjusting mechanism is mounted on the −20° inclined positioning plate, the combined compensation provided by the permeable flexible cushion layer on the bottom of the suction cup 11 and in the height direction enables adaptation to inclined dam surfaces between 75° and 90° (as shown in FIG. 7*f*); in a case where the angle adjusting mechanism is mounted on the 0° inclined positioning plate, the permeable flexible cushion layer on the bottom of the suction cup 11 enables adaptation to vertical dam surfaces of 90° (as shown in FIG. 7*g*).

Figure 8:
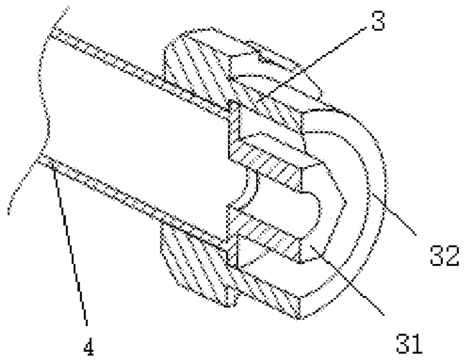
FIG. 8 is a cross-sectional view of a male quick coupler in a crawling and adhesion device in Embodiment 1 of the invention.
Figure 9:
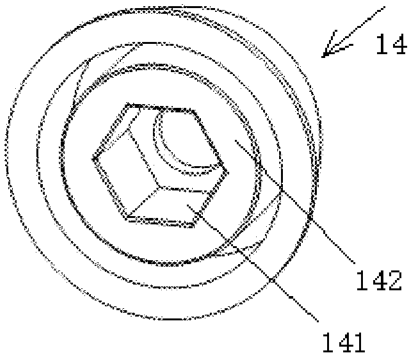
FIG. 9 is a structural diagram of a female quick coupler matching the male quick coupler in FIG. 8.

In a specific implementation of this embodiment, as shown in FIGS. 8 and 9, the crawling and adhesion device further comprises a connector connected with the robot 13, and the connector comprises a male connector 3 arranged on an upper part of the length adjusting mechanism and a female connector 14 arranged on the robot 13 body. Preferably, the connector is a quick-change connector, and the female connector 14 is embedded in the robot 13 body, such that the streamlined shape of the robot 13 will not be affected.

As shown in FIG. 8, one end of the male connector 3 comprises a centrally positioned prism 31 and an external connecting column 32 arranged outside the prism 31, and the other end of the male connector 3 is connected with the length adjusting mechanism. As shown in FIG. 9, the female connector 14 comprises a centrally positioned prismatic hole 141 and an inner connecting column 142 arranged outside the prismatic hole 141. The prism 31 matches the prismatic hole 141, the outer connecting column 32 matches the inner connecting column 142, and threaded connection is achieved through inner threads on an inner wall of the outer connecting column 32 and outer threads on an outer wall of the inner connecting column 142.

The connector employs threaded constraints for axial alignment and is embedded in the length adjusting mechanism, allowing for manual locking and disassembly. Preferably, the connecting end prism 31 of the connector is a hexagonal prism which restricts the torsion of the crawling and adhesion device, enhancing the torsional resistance and ensuring the stability of the crawling and adhesion device. The female connector 14 is embedded in a casing of the robot 13, preserving the streamlined shape of the robot 13.

In addition to being adjustable in installation angle and easy to install, the connector also possesses excellent sealing performance, effectively preventing leaks.

In a specific implementation of this embodiment, the wheeled leg mechanism 1 further comprises a buoyancy block 7 arranged in the shell 10 and fixedly installed on a supporting frame 17, allowing the entire crawling and adhesion device to achieve neutral buoyancy in water. This configuration does not affect the center of gravity of the underwater robot 13 body, thus enhancing the stability of the device and ensuring stable operation of the underwater robot 13.

In a specific implementation of this embodiment, the crawling and adhesion device further comprises connecting tubes 2, the wheeled leg mechanism 1, the length adjusting mechanism, the angle adjusting mechanism and the connectors connected with the robot 13 all feature at least two sets, adjacent sets are connected via the connecting tubes 2, and two ends of the connecting tube 2 are respectively connected with the length adjusting mechanisms in the two sets.

Two ends of the connecting tube 2 are provided with bosses which have internal threads, and a connecting column which has external threads is welded onto the length adjusting mechanism, thus realizing threaded connection. The counter-rotating threaded connection provides excellent fastening to prevent loosening and detachment at the connection points, thereby constraining the distance between different sets of wheeled leg mechanisms 1 and improving the overall rigidity of the crawling and adhesion device, as well as its stability when operating in strong or turbulent flows.

By changing the length of the connecting tube 2 or replacing it with tubes of different lengths, the distance between the wheeled leg mechanisms 1 can be adjusted, broadening the application range of the crawling and adhesion device.

In a specific implementation of this embodiment, the wheeled leg mechanism 1, the length adjusting mechanism, the angle adjusting mechanism and the connectors connected with the robot 13 all feature four sets, arranged as one set at the front, one at the back, and one on each side, with the front two sets forming a pair and the rear two sets forming another pair.

In use, as shown in FIGS. 3-6, based on design drawings of the underwater dam surface and the underwater detection posture of the robot 13 body, the crawling and adhesion device may be mounted horizontally, at a 45° angle, or vertically on the robot 13 body. When the operational surface of the crawling and adhesion device is an inclined dam surface, there is a significant difference in the axial distance between the front pair and rear pair of wheeled leg mechanisms 1. The lengths of the length adjusting mechanisms for both pairs are adjusted to compensate for the height difference produced by the two sets of wheeled leg mechanisms 1.

In a specific implementation of this embodiment, the connecting tube 2 is a hollow cylindrical tube, which not only reduces weight but also offsets part of the gravitational force acting on the crawling and adhesion device in water.

In a specific implementation of this embodiment, the shell 10 of the wheeled leg mechanism 1 is designed with lightweight skin to ensure an overall streamlined shape, thereby reducing water resistance and weight while also alleviating part of the gravitational force acting on the crawling and adhesion device in water.

In a specific implementation of this embodiment, the supporting framework 17 is arranged on a bottom of the shell, serving as a base to enclose the shell. The supporting framework 17 provides rigid support for the adhesion units 9 and the crawling wheels 12. Additionally, the supporting framework 17 and the bearing wall 8 are integrated into a single structure.

In a specific implementation of this embodiment, the adhesion unit 9 is designed for modular installation, allowing for the selection of an appropriate number of units to be installed on the wheeled leg mechanism 1 as needed. Moreover, the adhesion unit 9 is fixed to the supporting framework 17 with a flange.

In a specific implementation of this embodiment, by employing a mixed-flow pump to create negative pressure suction, the adhesion unit 9 can automatically compensate for variations in height and angle on a suction surface, accommodating irregular and uneven dam surfaces.

In a specific implementation of this embodiment, the crawling wheel 12 is a polyurethane universal wheel.

In a specific implementation of this embodiment, the suction cup 11 is a metal suction cup.

Embodiment 2

The difference between Embodiment 2 and Embodiment 1 is that Embodiment 2 proposes an adhesion unit with the following structure.

Figure 10:
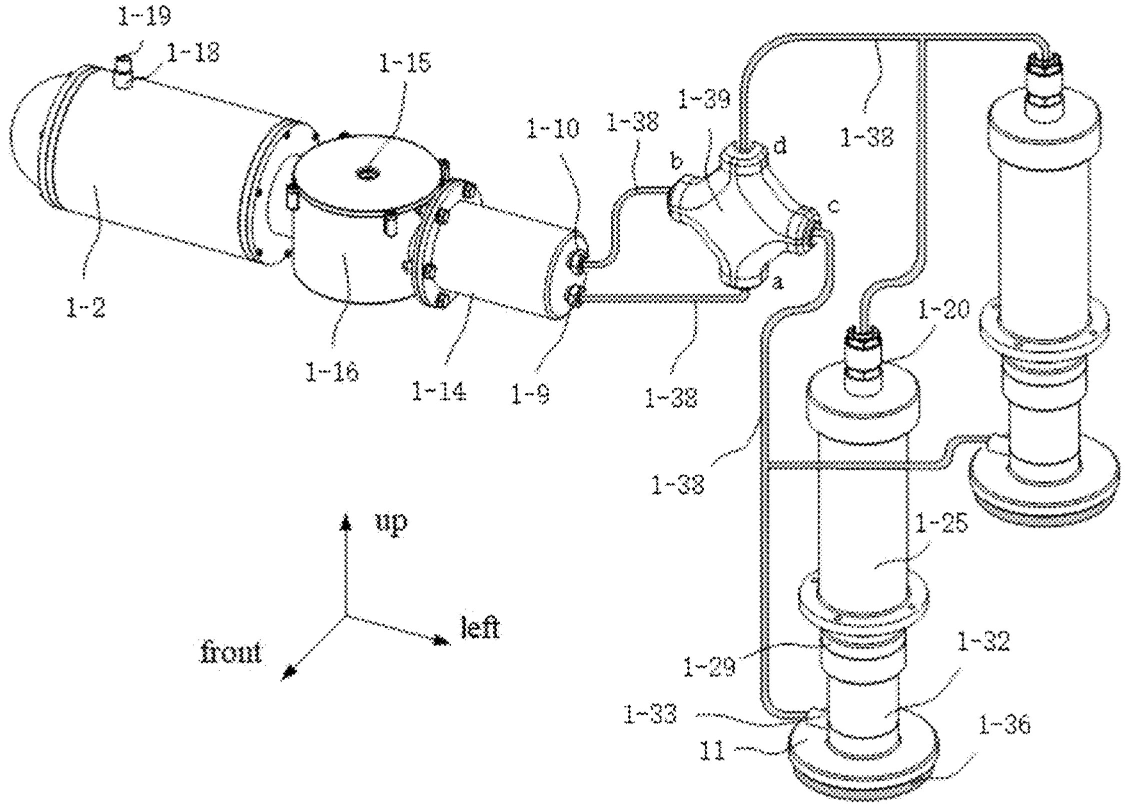
FIG. 10 is a schematic diagram of an adhesion unit in Embodiment 2.

As shown in FIG. 10, the adhesion unit 9 comprises an underwater negative pressure pump, a suction cup 11, a displacement compensation component and a waterproof electromagnetic directional valve 1-39.

Figure 11:
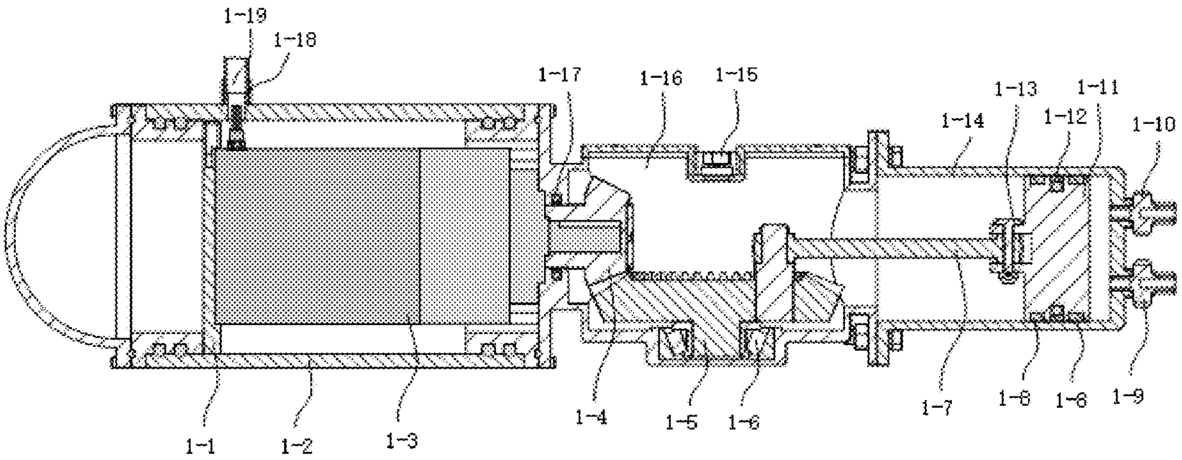
FIG. 11 is a cross-sectional view of an underwater negative pressure pump of an adhesion unit in Embodiment 2.

The underwater negative pressure pump is a power generation device that enables negative pressure suction for the adhesion unit 9. Specifically, as shown in FIG. 11, the underwater negative pressure pump comprises a watertight compartment 1-2, a gear box 1-16 fixedly connected with the watertight compartment 1-2, and a negative pressure pump cylinder 1-14 fixedly connected with the gear box 1-16.

A gear motor 1-3 is arranged in the watertight compartment 1-2, a small bevel gear 1-4 and a large bevel gear 1-5 engaging with the small bevel gear 1-4 are arranged in the gear box 1-16, a negative pressure pump piston 1-11 and a connecting rod 1-7 connected with the negative pressure pump piston 1-11 are arranged in the negative pressure pump cylinder 1-14, a motor shaft of the gear motor 1-3 is connected with the small bevel gear 1-4, the small bevel gear 1-4 engages with the large bevel gear 1-5, and the large bevel gear 1-5 is connected with the connecting rod 1-7. When the gear motor 1-3 is started, the motor shaft drives the small bevel gear 1-4 to rotate, and the small bevel gear 1-4 drives the large bevel gear 1-5 engaging therewith to rotate, thus driving the negative pressure pump piston 1-11 to reciprocate.

The negative pressure pump piston 1-11 and the connecting rod 1-7 are connected through a second pivot pin 1-13. The inlet check valve 1-9 and the outlet check valve 1-10 are arranged at an end of the negative pressure pump cylinder 1-14, a first filter device 1-15 is arranged at a top of the gear box 1-16, one end of the negative pressure pump piston 1-11 is connected with the inlet check valve, and the other end of the negative pressure pump piston 1-11 is connected with an external water area through the first filter device 1-15, so that the water pressure at two ends of the negative pressure pump piston 1-11 can be balanced, and the negative pressure pump can work normally at various underwater depths.

To prevent water that enters the gear box 1-16 through the first filter device 1-15 from reaching the watertight chamber

1-2, a rotating dynamic seal is employed between the small bevel gear 1-4 and the watertight compartment 1-2.

More specifically, as shown in FIG. 11, a dynamic seal ring 1-17 is arranged between the small bevel gear 1-4 and the watertight chamber 1-2 to ensure the sealing performance of the watertight chamber 1-2.

Optionally, the first filter device 1-15 is an internal hexagonal external threaded filter device, which is fixed to a top of the gear box 1-16 through threaded connection.

Figure 12:
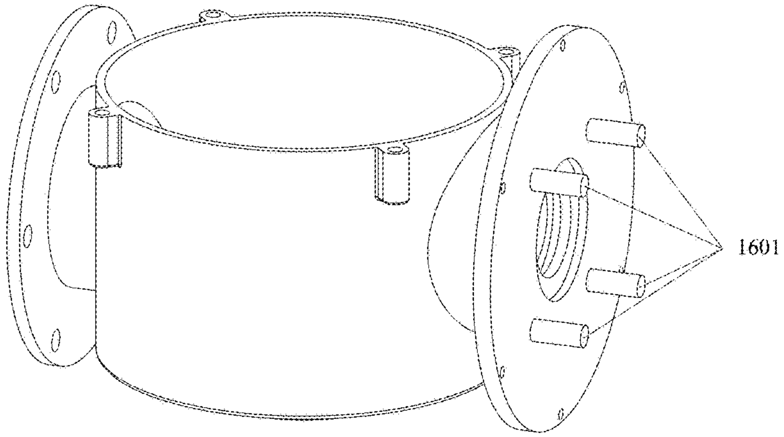
FIG. 12 is a structural diagram of a gear box housing of an underwater negative pressure pump of an adhesion unit in Embodiment 2.

As shown in FIGS. 11 and 12, an end, connected with the watertight compartment 1-2, of the gear box 1-16 is provided with a plurality of cylindrical positioning bosses 1601, and the cylindrical positioning bosses 1601 are connected with limiting holes in one end of the gear motor 1-3 to radially fix the gear motor 1-3.

As shown in FIG. 11, a motor support plate 1-1 is arranged in the watertight compartment 1-2 in a direction perpendicular to an axial direction of the gear motor 1-3, the gear motor 1-3 is fixedly installed on the motor support plate 1-1, and the motor support plate 1-1 is used for axially fixing the gear motor 1-3.

Thus, the cylindrical positioning bosses 1601 and the motor support plate 1-1 facilitate the fixation and installation of the gear motor within the watertight chamber 1-2.

As shown in FIG. 11, a first Glyd ring 1-12 and a plurality of first dustproof rings 1-8 are arranged between the negative pressure pump piston 1-11 and an inner wall of the negative pressure pump cylinder 1-14 to ensure the sealing performance on two sides of the negative pressure pump piston 1-11.

As shown in FIG. 11, a ceramic thrust bearing 1-6 is arranged in the gear box 1-16, which is fixed in a groove at the bottom of the gear box 1-16, with its inner ring connected to a boss at the bottom of the large bevel gear 1-5 by interference fit.

Figure 13:
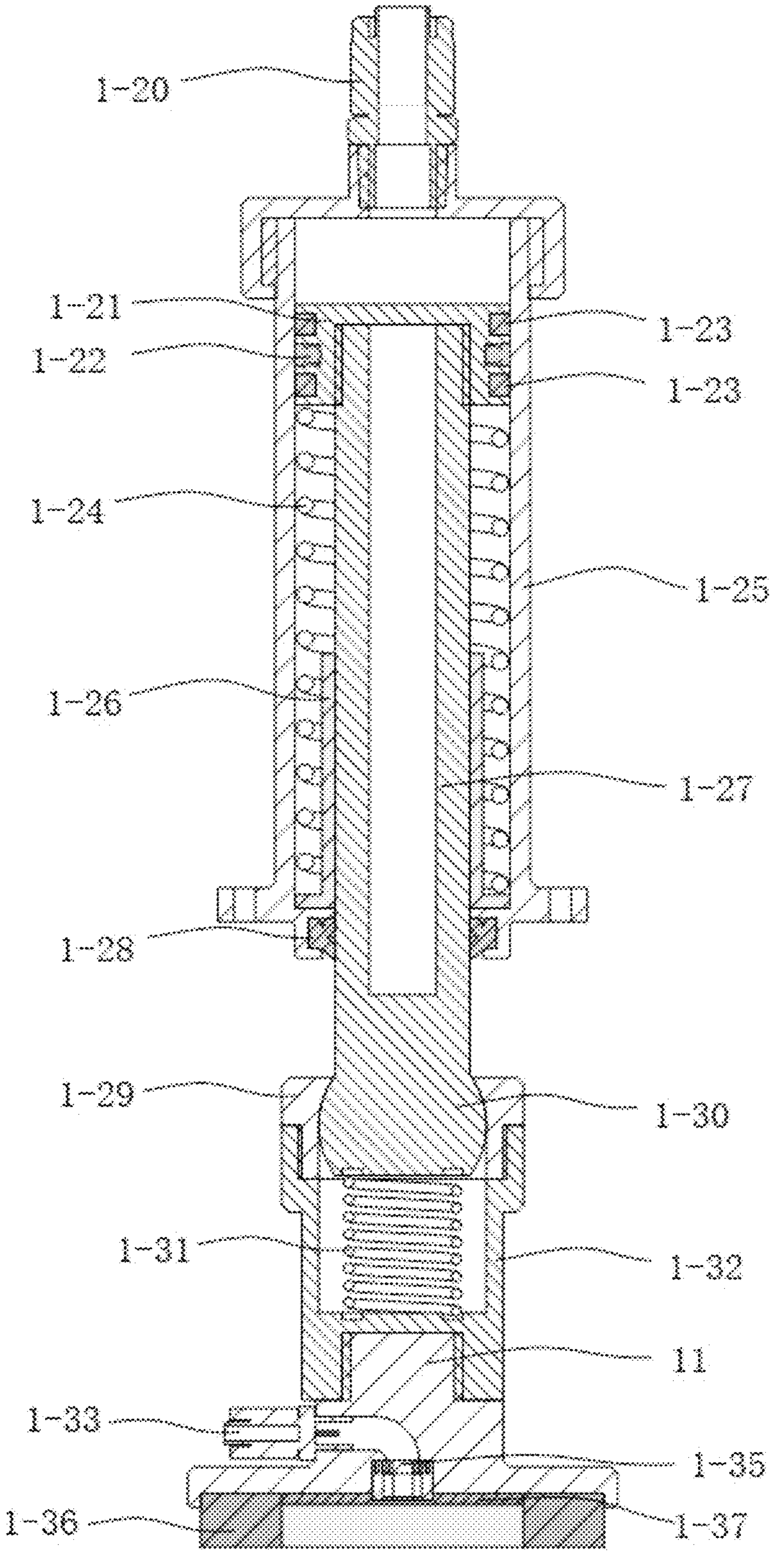
FIG. 13 is a cross-sectional view of a suction cup and a displacement compensation component in an adhesion unit in Embodiment 2.

As shown in FIG. 13, a filter membrane 1-37 is arranged in a suction cup chamber of the suction cup 11.

A suction cup water outlet connected with a suction cup water inlet is formed in a side face of the suction cup 11, the suction cup water outlet is connected with a suction cup water inlet tube connector 1-33, and the suction cup water inlet is provided with a second filter device 1-35.

Optionally, the second filter device 1-35 is an internal hexagonal external threaded filter device, which is connected with the suction cup water inlet through threads.

Through the arrangement of the filter membrane 1-37 in the suction cup chamber and the second filter device 1-35 at the suction cup water inlet, a dual-layer filtration system is established, ensuring unobstructed flow in an adhesion component pipeline.

As shown in FIGS. 10 and 13, a bottom of the suction cup 11 is provided with a permeable flexible cushion layer 1-36 to ensure the airtightness and stability of the suction cup in operation.

As shown in FIG. 13, a suction cup support 1-32 is fixedly connected to a top of the suction cup 11, and a spherical hinge cover plate 1-29 is fixedly connected to the suction cup support 1-32.

More specifically, the top of the suction cup 11 is connected to the suction cup support 1-32 by threads, and the suction cup support 1-32 is connected to the spherical hinge cover plate 1-29 by threads.

As shown in FIG. 13, the displacement compensation component comprises a hydraulic cylinder 1-25 and a spherical hinge joint 1-30.

A hydraulic cylinder piston 1-21 is arranged in the hydraulic cylinder 1-25, and a piston rod 1-27 is connected to the hydraulic cylinder piston 1-21.

The spherical hinge joint 1-30 comprises a shank and a spherical head, the shank of the spherical hinge joint 1-30 is located in the hydraulic cylinder 1-25, the piston rod 1-27 of the hydraulic cylinder piston 1-21 fits into the shank of the spherical hinge joint 1-30, and the spherical head of the spherical hinge joint 1-30 is hinged to the spherical hinge cover plate 1-29.

A return spring 1-24 is arranged between the shank of the spherical hinge joint 1-30 and an inner wall of the hydraulic cylinder 1-25. Together with the underwater negative pressure pump and the waterproof electromagnetic directional valve 1-39, the return spring 1-24 enables the suction cup to detach from the dam surface when the adhesion operation of the adhesion unit 9 is completed.

As shown in FIG. 13, a preload spring 1-31 is arranged in the suction cup support 1-32, one end of the preload spring 1-31 abuts against the spherical head of the spherical hinge joint 1-30, and the other end of the preload spring 1-31 abuts against the bottom of the suction cup support 1-32.

The structure of the spherical hinge joint 1-30 and the preload force of the preload spring 1-31 keep the suction cup support 1-32 in a corrected rotational state with respect to the spherical hinge joint 1-30, allowing the adhesion unit 9 to automatically adapt to the uneven dam surface through the spherical hinge joint 1-30.

As shown in FIG. 13, the displacement compensation component further comprises a guide limiting sleeve 1-26, which is arranged between the inner wall of the hydraulic cylinder 1-25 and the shank of the spherical hinge joint 1-30 and is tightly attached to a bottom of the hydraulic cylinder 1-25 by means of an elastic force of the return spring 1-24. The guide limiting sleeve 1-26 serves to guide the piston rod 1-27 while also limiting the maximum stroke of the hydraulic cylinder piston 1-21.

As shown in FIG. 13, a second Glyd ring 1-22 and a plurality of second dustproof rings 1-23 are arranged between the hydraulic cylinder piston 1-21 and the inner wall of the hydraulic cylinder 1-25 to ensure the sealing performance on two sides of the hydraulic cylinder piston 1-21.

A third dustproof ring 1-28 is arranged between a bottom end of the hydraulic cylinder 1-25 and the shank of the spherical hinge joint 1-30 to prevent foreign particles in external water areas from entering the hydraulic cylinder 1-25.

As shown in FIG. 13, a top of the hydraulic cylinders 1-25 is also provided with a hydraulic cylinder water inlet which is connected with a hydraulic cylinder tube connector 1-20.

As shown in FIG. 10, the waterproof electromagnetic directional valve 1-39 is provided with four valve ports, that is, ports a, b, c, and d. Port a is connected to the inlet check valve 1-9 through a telescopic hose 1-38, port b to the outlet check valve 1-10 through a telescopic hose 1-38, port c to the suction cup water inlet tube connector 1-33 of the suction cup 11 through a telescopic hose 1-38, and port d to the hydraulic cylinder tube connector 1-20 at the top of the hydraulic cylinder 1-25.

As shown in FIG. 10, a plurality of suction cups 11 may be provided, and accordingly, a plurality of displacement compensation components are provided; and the suction cup water inlet tube connectors 1-33 of all the suction cups 11 are connected through telescopic hoses 1-38 and then linked to port c of the waterproof electromagnetic directional valve 1-39, and the hydraulic cylinder tube connectors 1-20 at the top of the plurality of hydraulic cylinders 1-25 are also connected through telescopic hoses 1-38 and then linked to port d of the waterproof electromagnetic directional valve 1-39.

As shown in FIGS. 10 and 11, a side face of the watertight chamber 1-2 is connected to a pressure tube 1-18 via a pressure tube fixing sleeve 1-19, and the pressure tube 1-18 serves as an underwater channel for electrical wires. In this way, the difficulties in transmitting energy and control signals are addressed for the underwater gear motor 1-3.

By adopting the adhesion units, the underwater negative pressure pump drives the piston to reciprocate through bevel gear transmission, alternating the opening and closing of the inlet and outlet check valves to extract water from the suction cup chamber. The suction cup 11 utilizes the underwater negative pressure pump to create a pressure differential between the suction cup chamber and the external water, generating a suction force, while automatically adapting to the uneven dam surface through the spherical hinge joint 1-30 and the permeable flexible cushion layer 1-36. The displacement compensation component uses the underwater negative pressure pump to discharge water extracted from the suction cup chamber into the hydraulic cylinder 1-25, pushing the hydraulic cylinder piston 1-21 to move axially and actively compensating for the distance between the suction cup 11 and the dam surface. The return of the suction cup 11 relies on the waterproof electromagnetic directional valve 1-39, and the underwater negative pressure pump extracts water from the hydraulic cylinder 1-25, allowing the suction cup 11 to detach from the dam surface under the force of the return spring 1-24.

In another embodiment, the control method for the adhesion unit 9 is as follows:

- opening the inlet check valve 1-9, as well as ports a and c of the waterproof electromagnetic directional valve 1-39, closing the outlet check valve 1-10, as well as ports b and d of the waterproof electromagnetic directional valve 1-39, and starting the gear motor 1-3 which drives the negative pressure pump piston 1-11 to move left through bevel gear transmission, extracting water from the suction cup chamber of the suction cup 11 into the negative pressure pump cylinder 1-14;
- closing the inlet check valve 1-9, as well as ports a and c of the waterproof electromagnetic directional valve 1-39, opening the outlet check valve 1-10, as well as ports b and d of the waterproof electromagnetic directional valve 1-39, reversing the rotation of the gear motor 1-3 to drive the negative pressure pump piston 1-11 to move right through bevel gear transmission, discharging water from the negative pressure pump cylinder 1-14 into the hydraulic cylinder 1-25 from the top, pushing the hydraulic cylinder piston 1-21 to move axially downwards, and using the structure of the spherical hinge joint 1-30 and the preload force of the preload spring 1-31 to keep the suction cup support 1-32 in a corrected rotational state with respect to the spherical hinge joint 1-30, compensating for the distance between the suction cup 11 and the dam surface;
- after the operation is complete, opening the inlet check valve 1-9, as well as ports a and d of the waterproof electromagnetic directional valve 1-39, closing the outlet check valve 1-10, as well as ports b and c of the waterproof electromagnetic directional valve 1-39, starting the gear motor 1-3 to drive the negative pressure pump piston 1-11 to move left through bevel gear transmission, extracting water from the hydraulic cylinder 1-25 into the negative pressure pump cylinder 1-14, and allowing the suction cup 11 to detach from the dam surface under the action of the return spring 1-24.

The adhesion unit 9 of the invention is designed with the preload spring 1-31 positioned between the spherical hinge joint 1-30 and the suction cup support 1-32, and the structure of the spherical hinge joint 1-30 and the preload force of the preload spring 1-31 keep the suction cup support 1-32 in a corrected rotational state with respect to the spherical hinge joint 1-30. Together with the permeable flexible cushion layer 1-36 positioned at the bottom of the suction cup 11, this allows the suction cup 11 to securely adhere to the uneven dam surface.

The adhesion unit 9 uses the negative pressure pump to discharge water extracted from the suction cup chamber into the hydraulic cylinder, pushing the hydraulic cylinder piston 1-21 to move axially to actively compensate for the distance between the suction cup 11 and the dam surface. The return of the suction cup relies on the waterproof electromagnetic directional valve 1-39, and the negative pressure pump extracts water from the hydraulic cylinder, allowing the suction cup 11 to detach from the dam surface under the force of the return spring 1-24.

The adhesion unit 9 of the invention features the inlet and outlet check valves 1-9 at one end of the negative pressure pump piston 1-11, while the other end of the negative pressure pump piston 1-11 is connected to the external water area via the first filter device 1-15. This arrangement balances the water pressure at two ends of the piston, allowing the negative pressure pump to function properly at various underwater depths.

The suction force generated by the negative pressure pump piston 1-11 can be transmitted to the hydraulic cylinder 1-25 via the suction cup 11. The hydraulic cylinder 1-25 is provided with a flange, allowing it to be connected to the supporting frame 17 of the crawling and adhesion device, and then the hydraulic cylinder 1-25 transfers the suction force to the crawling and adhesion device. The telescopic hoses 1-38 are installed on side faces of the suction cup 11 and function solely for water intake and drainage. This effectively addresses the issue in the prior art where the water pump removes water from the suction cup chamber to create negative pressure suction, and the suction force is then transmitted to the telescopic hose 1-38, causing the device to be unable to perform stable construction due to the lack of sufficient stiffness in its structure to resist underwater strong current impacts.

The crawling and adhesion device of the invention has a simple structure, is easy to manufacture and install, and can adhere to dam surfaces with varying degrees of inclination, utilizing three mounting methods: horizontal, 45-degree inclined, and vertical, to accommodate inclined dam surfaces from 0° degrees to 90°. With excellent length and angle compensation effects and high adhesion strength, the crawling and adhesion device is capable of navigating and inspecting dam surfaces with slopes between 0° and 90°, thereby enhancing the stability and safety of underwater robots during operation.

It should be noted that in this application, relational terms such as first and second are only used to distinguish one entity or operation from another entity or operation, and do not necessarily require or imply any such actual relationship or order between these entities or operations. Further, terms such as “comprise”, “include” or any variation thereof are intended to cover a non-exclusive inclusion, such that a process, method, article, or apparatus that includes a series of elements not only includes those listed elements but also includes other elements not expressly listed or also includes inherent elements of such a process, method, article, or apparatus. Without further restrictions, an element defined by the phrase "comprising a" does not exclude the existence of other identical elements in the process, method, article or apparatus comprising the element.

Although the embodiments of the invention have been shown and described, it will be understood by those skilled in the art that various changes, modifications, substitutions and variations can be made to these embodiments without departing from the principles and spirit of the invention, and the scope of the invention is defined by the appended claims and their equivalents.

The invention claimed is:

1. A crawling and adhesion device for underwater inspection robots used on dams, comprising at least one set of wheeled leg mechanisms (1), an angle adjusting mechanism and a length adjusting mechanism, wherein an upper end of the length adjusting mechanism is connected with a robot (13); the wheeled leg mechanism (1) comprises a shell (10), adhesion units (9) and a crawling wheel (12) arranged under the shell (10); the adhesion unit (9) comprises a suction cup (11), which is arranged under the shell (10) and adheres to a dam surface through negative pressure suction; the length adjusting mechanism is used for adjusting a distance between the wheeled leg mechanism (1) and a robot (13) body; and the angle adjusting mechanism is used for adjusting an angle of the wheeled leg mechanism (1) with respect to a horizontal dam surface.

2. The crawling and adhesion device for underwater inspection robots used on dams according to claim 1, wherein the length adjusting mechanism is a spiral length adjusting mechanism, and comprises a telescopic outer tube (4) arranged outside, a telescopic inner tube (5) arranged inside the telescopic outer tube (4) and a bolt (15), and the telescopic outer tube (4) and the telescopic inner tube (5) are connected threadedly; and a groove (41) is formed in the telescopic outer tube (4), a tube wall of the telescopic outer tube (4) is provided with a threaded hole corresponding to the groove (41), and the bolt (15) is embedded in the telescopic outer tube (4) through the threaded hole in the tube wall.

3. The crawling and adhesion device for underwater inspection robots used on dams according to claim 2, wherein the angle adjusting mechanism is a swinging type angle adjusting mechanism, and comprises a telescopic inner tube (5) arranged in the telescopic outer tube (4), an upper part of the telescopic inner tube (5) is positioned in the telescopic outer tube (4), a lower part is arranged in the shell (10) and connected with the shell (10) through a first pivot pin (6), and the telescopic inner tube (5) is able to swing around the first pivot pin (6); and a plurality of inclined positioning plates (16) are arranged in the shell (10), and the inclined positioning plates (16) are matched with a lower end of the telescopic inner tube (5) and used for limiting a position of the telescopic inner tube (5).

4. The crawling and adhesion device for underwater inspection robots used on dams according to claim 3, wherein the shell (10) further comprises a bearing wall (8), the plurality of inclined positioning plates (16) are arranged on the bearing wall (8), and the first pivot pin (6) is also arranged on the bearing wall (8).

5. The crawling and adhesion device for underwater inspection robots used on dams according to claim 3, wherein the number of the inclined positioning plates (16) is three, one is arranged in a vertical direction, and the other two are positioned in bilateral symmetry with respect to the vertical direction.

6. The crawling and adhesion device for underwater inspection robots used on dams according to claim 1, further comprising a connector connected with the robot (13), wherein the connector comprises a male connector (3) arranged on an upper part of the length adjusting mechanism and a female connector (14) arranged on the robot body.

7. The crawling and adhesion device for underwater inspection robots used on dams according to claim 6, wherein one end of the male connector (3) comprises a centrally positioned prism (31) and an external connecting column (32) arranged outside the prism (31), and the other end of the male connector (3) is connected with the length adjusting mechanism; the female connector (14) comprises a centrally positioned prismatic hole (141) and an inner connecting column (142) arranged outside the prismatic hole (141); and the prism (31) matches the prismatic hole (141), the outer connecting column (32) matches the inner connecting column (142), and threaded connection is achieved through inner threads on an inner wall of the outer connecting column (32) and outer threads on an outer wall of the inner connecting column (142).

8. The crawling and adhesion device for underwater inspection robots used on dams according to claim 1, wherein the wheeled leg mechanism (1) further comprises a buoyancy block (4) arranged in the shell (10) and fixedly installed on a supporting frame (17).

9. The crawling and adhesion device for underwater inspection robots used on dams according to claim 1, further comprising connecting tubes, wherein the wheeled leg mechanism (1), the length adjusting mechanism, the angle adjusting mechanism and connectors connected with the robot (13) all feature at least two sets, adjacent sets are connected via the connecting tubes (2), and two ends of the connecting tube (2) are respectively connected with the length adjusting mechanisms in the two sets.

10. The crawling and adhesion device for underwater inspection robots used on dams according to claim 1, wherein the adhesion unit (9) further comprises an underwater negative pressure pump, a displacement compensation component and a waterproof electromagnetic directional valve (1-39); an end of the underwater negative pressure pump is provided with an inlet check valve (1-9) and an outlet check valve (1-10); a bottom of the suction cup (11) is provided with a permeable flexible cushion layer (1-36), a suction cup support (1-32) is fixedly connected to a top of the suction cup (11), and a spherical hinge cover plate (1-29) is fixedly connected to the suction cup support (1-32); the displacement compensation component comprises a hydraulic cylinder (1-25), a hydraulic cylinder piston (1-21) is arranged in the hydraulic cylinder (1-25), a piston rod (1-27) of the hydraulic cylinder piston (1-21) is connected with a spherical hinge joint (1-30), the piston rod (1-27) fits into a shank of the spherical hinge joint (1-30), and the shank of the spherical hinge joint (1-30) is located in the hydraulic cylinder (1-25); a return spring (1-24) is arranged between the shank of the spherical hinge joint (1-30) and an inner wall of the hydraulic cylinder (1-25), a spherical head of the spherical hinge joint (1-30) is hinged to the spherical hinge cover plate (1-29), and a preload spring (1-31) abutting against the spherical head of the spherical hinge joint (1-30) is arranged in the suction cup support (1-32); and the waterproof electromagnetic directional valve (1-39) is provided with four valve ports, and the four valve ports are respectively connected with the inlet check valve (1-9), the outlet check valve (1-10), the suction cup (11) and the hydraulic cylinder (1-25).

11. The crawling and adhesion device for underwater inspection robots used on dams according to claim 10, wherein the underwater negative pressure pump comprises a watertight compartment (1-2), a gear box (1-16) fixedly connected with the watertight compartment (1-2), and a negative pressure pump cylinder (1-14) fixedly connected with the gear box (1-16); a gear motor (1-3) is arranged in the watertight compartment (1-2), a small bevel gear (1-4) and a large bevel gear (1-5) engaging with the small bevel gear (1-4) are arranged in the gear box (1-16), and a negative pressure pump piston (1-11) and a connecting rod (1-7) connected with the negative pressure pump piston (1-11) are arranged in the negative pressure pump cylinder (1-14); a motor shaft of the gear motor (1-3) is connected with the small bevel gear (1-4), a rotating dynamic seal is employed between the small bevel gear (1-4) and the watertight compartment (1-2), the large bevel gear (1-5) is connected with the connecting rod (1-7), and the gear motor (1-3) drives the negative pressure pump piston (1-11) to reciprocate through bevel gear transmission; and the inlet check valve (1-9) and the outlet check valve (1-10) are arranged at an end of the negative pressure pump cylinder (1-14), and a first filter device (1-15) is arranged at a top of the gear box (1-16).

12. The crawling and adhesion device for underwater inspection robots used on dams according to claim 10, wherein a filter membrane (1-37) is arranged in a suction cup chamber of the suction cup (11), a suction cup water outlet connected with a suction cup water inlet is formed in a side face of the suction cup (11), the suction cup water inlet is provided with a second filter device (35), and the suction cup water outlet is connected with one of the valve ports of the waterproof electromagnetic directional valve (1-39) through a telescopic hose (1-38).

13. The crawling and adhesion device for underwater inspection robots used on dams according to claim 11, wherein an end, connected with the watertight compartment (1-2), of the gear box (1-16) is provided with a plurality of cylindrical positioning bosses (1601), and the plurality of cylindrical positioning bosses (1601) are connected with limiting holes in one end of the gear motor (1-3) to radially fix the gear motor (1-3).

14. The crawling and adhesion device for underwater inspection robots used on dams according to claim 11, wherein a motor support plate (1-1) is arranged in the watertight compartment (1-2) in a direction perpendicular to an axial direction of the gear motor (1-3), the gear motor (1-3) is fixedly installed on the motor support plate (1-1), and the motor support plate (1-1) is used for axially fixing the gear motor (1-3).

15. The crawling and adhesion device for underwater inspection robots used on dams according to claim 10, wherein the displacement compensation component further comprises a guide limiting sleeve (1-26), which is arranged between the inner wall of the hydraulic cylinder (1-25) and the shank of the spherical hinge joint (1-30) and is tightly attached to a bottom of the hydraulic cylinder (1-25) by means of an elastic force of the return spring (1-24).

16. The crawling and adhesion device for underwater inspection robots used on dams according to claim 10, wherein a plurality of suction cups (11) are provided, and accordingly, a plurality of displacement compensation components are provided; and the plurality of suction cups (11) are connected through telescopic hoses (1-38) and then linked to one of the valve ports of the waterproof electromagnetic directional valve (1-39), and the plurality of hydraulic cylinders (1-25) are also connected through telescopic hoses (1-38) and then linked to one of the valve ports of the waterproof electromagnetic directional valve (1-39).

17. The crawling and adhesion device for underwater inspection robots used on dams according to claim 11, wherein a dynamic seal ring (1-17) is arranged between the small bevel gear (1-4) and the watertight compartment (1-2).

18. The crawling and adhesion device for underwater inspection robots used on dams according to claim 10, wherein a second Glyd ring (1-22) and a second dustproof ring (1-23) are arranged between the hydraulic cylinder piston (1-21) and the inner wall of the hydraulic cylinder (1-25), and a third dustproof ring (1-28) is arranged between a bottom end of the hydraulic cylinder (1-25) and the shank of the spherical hinge joint (1-30).

* * * * *